United States Patent Office.

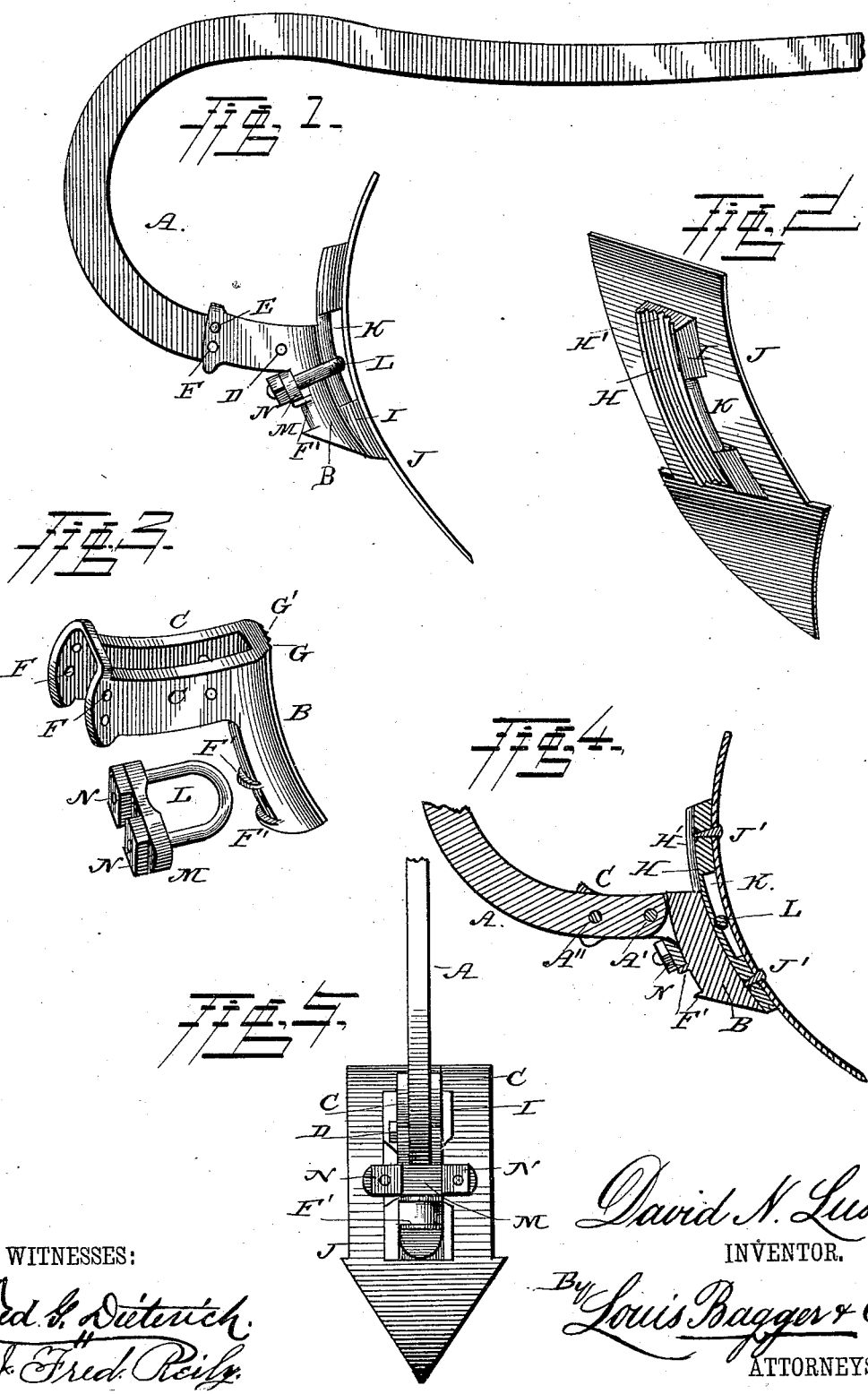

DAVID N. LUSE, OF ROSS, IOWA.

CULTIVATOR.

SPECIFICATION forming part of Letters Patent No. 296,983, dated April 15, 1884.

Application filed February 5, 1884. (No model.)

*To all whom it may concern:*

Be it known that I, DAVID N. LUSE, a citizen of the United States, and a resident of Ross, in the county of Audubon and State of Iowa, have invented certain new and useful Improvements in Cultivators; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved cultivator-beam and adjustable shovel. Fig. 2 is a perspective view of the shovel detached. Fig. 3 is a similar view of the shovel-holder or adjustable tongue for securing the shovel to the plow-beam. Fig. 4 is a longitudinal sectional view through the shovel and lower end of beam, and Fig. 5 is a rear view of the shovel and the lower end of the beam.

Similar letters of reference indicate corresponding parts in all the figures.

My invention has relation to that class of cultivators, especially corn-cultivators, which are so constructed as to admit of the adjustment of the shovel-blades at any desired angle; and it consists in the improved construction and combination of parts of the shovel-beams and shovels, whereby the most delicate adjustment of the shovel-blades may be obtained with the greatest degree of accuracy, as will be hereinafter more fully described and claimed.

In the accompanying drawings, A represents one of the plow-beams or shovel-beams, which may be made of either wood, iron, or steel, and is attached at its forward end to the cultivator-frame in any approved manner. The lower curved end of the beam is rounded on its lower edge and provided with the apertures A' A", for the purpose hereinafter specified.

The shovel-holder, which is shown in detail in Fig. 3 of the drawings, consists of the rounded curved tongue B and jaws or arms C, between which the lower curved extremity of the shovel-beam fits, and is pivotally secured by means of a suitable bolt, D, the shovel-holder turning readily upon the bolt D, and being held fast in its adjusted position by means of a pin, E, inserted through the upper aperture, A", of the lower end of the beam and through one of a series of apertures, F, in the jaws C; or a set-screw may be used instead of the pin E, if desired. The rounded curved tongue B is provided on its rear side with lugs or projections F', thereby dividing the length of the said rear side into two (or more) compartments, for the purpose hereinafter set forth, while the forward curved side of the tongue is provided with a series of longitudinal grooves, G, leaving between them the longitudinal ridges G', adapted to register with corresponding longitudinal grooves, H, cut in the curved rear face of the saddle I of the shovel-blade J.

The shovel consists of the blade J, of any suitable shape, upon the under side of which is secured by means of suitable bolts or rivets, J', the saddle I, the rear curved face of which is, as already stated, provided with a series of longitudinal grooves, H, leaving between them the longitudinal ridges H', adapted to register or mesh with the longitudinal grooves G of the tongue B, by which arrangement the shovel-blade can be adjusted to one side at any desired angle, the longitudinal grooves and ridges admitting of the most delicate adjustment of the said blade, and at the same time intermeshing, so as to hold the blade firmly in its adjusted position. By curving the tongue B and the inner face of the saddle I, as described, the shovel-blade may be moved up or down, so as to adjust with the utmost accuracy the slant or plane at which the said blade enters the earth. That face of the saddle I which bears against the back of the shovel-blade is recessed at K for the reception or admission of a yoke, L, by means of which the shovel-blade is secured to the shovel-holder, a cross-piece, M, and nuts N upon the extremities of the yoke serving to bind the same in its adjusted position. This cross-piece M is of such a width as to fit between or in any of the compartments formed by the projections F', thereby admitting of vertical adjustment of the shovel-blades, the longitudinal recess K rendering the said adjustment still more delicate and accurate.

From the foregoing description, taken in connection with the accompanying drawings, the construction and operation of my improved cultivator will readily be understood without requiring further explanation.

It will be seen that all of the connecting and adjustable parts are so constructed as to prevent the possibility of any slipping or working loose.

By securing the shovel upon the lower curved end of the plow-beam, with the top of the said shovel extending above the said lower curved end, when the shovel enters the earth, the beam is lowered nearly level with the surface, which prevents it from gathering trash or dirt, so that there is nothing to prevent the shovel from doing its intended work with ease and thoroughness. The shovel may further be set at such an angle as to leave the ground nearly level after the furrow has been cut, in order to prevent washing or gullying out on hilly land; or it may be set to throw the dirt in ridges to suit the operator, these results being effected by increasing or lessening the slant or angle at which the shovel enters the ground.

If desired, instead of the yoke L and cross-piece M, the shovel may be connected to the holder by means of a suitable bolt passing through a longitudinal slot in the rounded tongue B and a transverse slot in the saddle I, as will readily be understood.

Having thus described my invention, I claim and desire to secure by Letters Patent of the United States—

As an improvement in cultivators, the combination of the curved beam A, having apertures A' A'', and rounded at its lower end, shovel-holder consisting of the curved rounded tongue B, having the longitudinal grooves G and lugs or projections F', and jaws C C, adapted to fit on either side of the lower rounded end of the beam A, pivot-bolt D, removable and adjustable shovel, comprising the blade J and saddle I, secured to the rear side of the shovel-blade, and provided with the recess K and longitudinal grooves H, and yoke L, having cross-piece M and nuts N, all constructed and arranged to operate substantially in the manner and for the purpose shown and described.

In testimony that I claim the foregoing as my own I have hereunto affixed my signature in presence of two witnesses.

DAVID N. LUSE.

Witnesses:
CHAS. E. FLIESBACH,
H. W. VAN GORDER.